US012252123B2

(12) United States Patent
Oh et al.

(10) Patent No.: US 12,252,123 B2
(45) Date of Patent: Mar. 18, 2025

(54) METHOD FOR CONTROLLING DRIVING FORCE OF VEHICLE

(71) Applicants: Hyundai Motor Company, Seoul (KR); Kia Corporation, Seoul (KR)

(72) Inventors: Ji Won Oh, Hwaseong-Si (KR); Jeong Soo Eo, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 246 days.

(21) Appl. No.: 18/071,393

(22) Filed: Nov. 29, 2022

(65) Prior Publication Data

US 2023/0406306 A1 Dec. 21, 2023

(30) Foreign Application Priority Data

Jun. 16, 2022 (KR) .................. 10-2022-0073360

(51) Int. Cl.
*B60W 30/18* (2012.01)
*B60W 10/04* (2006.01)
*B60W 40/06* (2012.01)
*B60W 50/00* (2006.01)

(52) U.S. Cl.
CPC ...... *B60W 30/18009* (2013.01); *B60W 10/04* (2013.01); *B60W 40/06* (2013.01); *B60W 2050/0055* (2013.01); *B60W 2050/0056* (2013.01); *B60W 2510/22* (2013.01);
(Continued)

(58) Field of Classification Search
CPC ........... B60W 30/18172; B60W 10/22; B60W 50/00; B60W 10/08; B60W 40/068; B60W 30/025; B60W 10/04; B60W 10/184; B60W 30/18054; B62K 11/007; H02P 5/46; B60G 17/0152; B60L 15/20; B60L 3/106; B62D 6/10
See application file for complete search history.

(56) References Cited

U.S. PATENT DOCUMENTS 8,442,753 B2 * 5/2013 Doi ....................... B62K 11/007
 701/124
10,942,075 B2 * 3/2021 Oschlies .................. B62D 6/10
(Continued)

*Primary Examiner* — Yuri Kan
(74) *Attorney, Agent, or Firm* — Morgan, Lewis & Bockius LLP

(57) ABSTRACT

A method of controlling driving force of a vehicle, includes providing a first filter for removing or reducing a natural frequency component of the vehicle suspension pitch motion, and a second filter for extracting or increasing the natural frequency component of the vehicle suspension pitch motion to a controller of the vehicle, determining a required driving force command based on vehicle driving information collected during driving of the vehicle, determining a driving force command after filter application through a processing process by the first filter taking the determined required driving force command as input thereof, determining a driving force correction amount through a processing process by the second filter taking feedback driving force as input thereof, and correcting the driving force command after filter application using the driving force correction amount and controlling driving force applied to a driving wheel of the vehicle by a driving device of the vehicle using the driving force command after the correction.

19 Claims, 11 Drawing Sheets

(52) U.S. Cl.
CPC . *B60W 2520/26* (2013.01); *B60W 2710/0666* (2013.01); *B60W 2710/083* (2013.01)

(56) References Cited

U.S. PATENT DOCUMENTS

| | | | |
|---|---|---|---|
| 2015/0151745 A1* | 6/2015 | Saito | B60W 30/18054 |
| | | | 701/54 |
| 2015/0217766 A1* | 8/2015 | Kelly | B60W 10/184 |
| | | | 701/94 |
| 2015/0217767 A1* | 8/2015 | Kelly | B60W 10/04 |
| | | | 701/93 |
| 2016/0272211 A1* | 9/2016 | Igarashi | B60W 30/025 |
| 2017/0066345 A1* | 3/2017 | Kruijswijk | B60L 3/106 |
| 2018/0264947 A1* | 9/2018 | Suzuki | B60L 15/20 |
| 2019/0039429 A1* | 2/2019 | Fujii | B60G 17/0152 |
| 2020/0259431 A1* | 8/2020 | Sawada | H02P 5/46 |
| 2021/0171017 A1* | 6/2021 | Oh | B60W 40/068 |
| 2023/0249703 A1* | 8/2023 | Oh | B60W 10/08 |
| | | | 701/22 |
| 2023/0303054 A1* | 9/2023 | Oh | B60W 50/00 |
| 2023/0303087 A1* | 9/2023 | Oh | B60W 10/22 |

\* cited by examiner

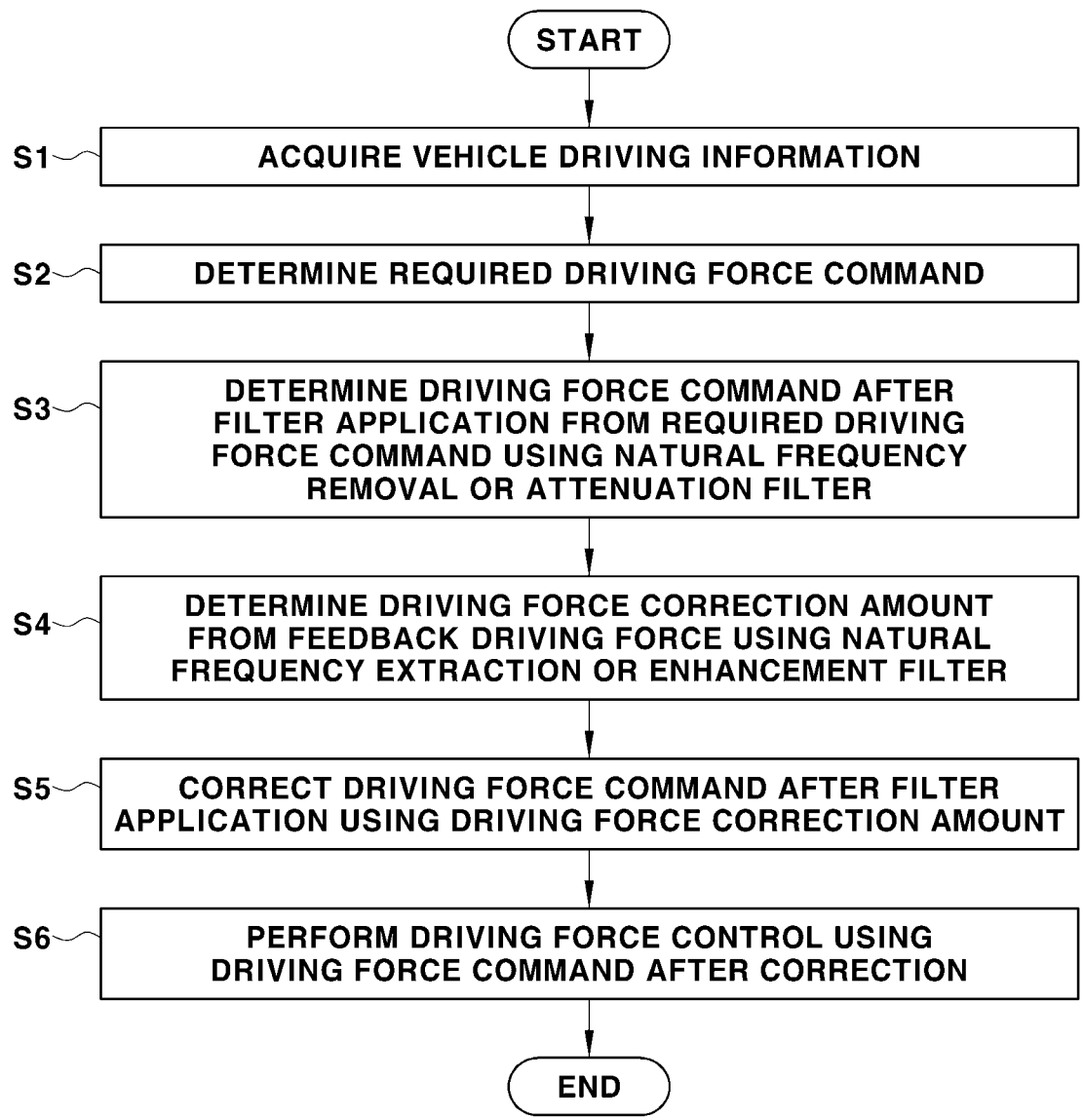

——— USED COMMAND TQ1
- - - - USED COMMAND TQ2
(ideal:TORQUE INTERVENTION DOES NOT OCCUR)
—·—·— USED COMMAND TQ3
(DO NOT APPLY ATTENUATION FILTER)
——— USED COMMAND TQ4
(TORQUE INTERVENTION OCCURS;DO NOT APPLY CORRECTION)
- - - - USED COMMAND TQ4
(TORQUE INTERVENTION OCCURS;APPLY CORRECTION)

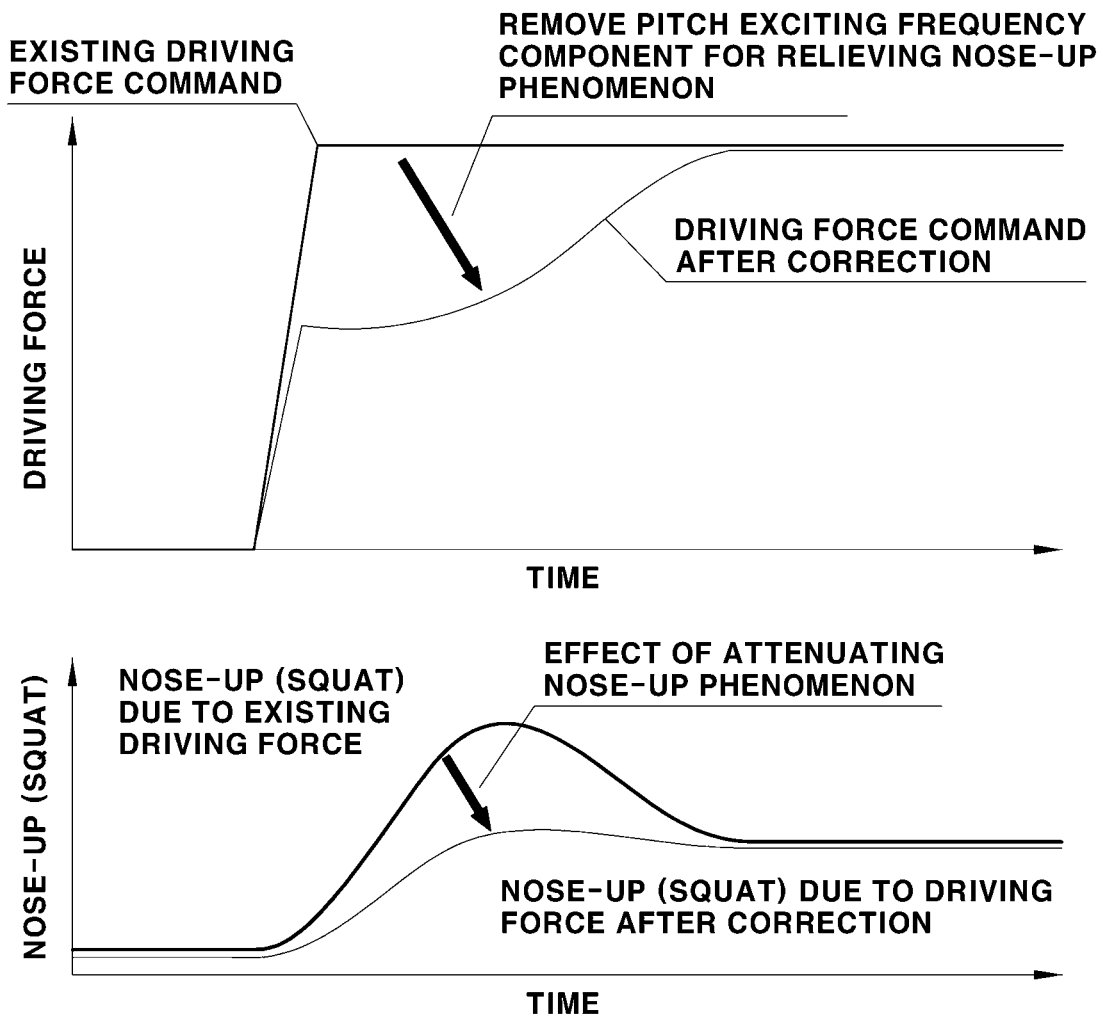

METHOD FOR CONTROLLING DRIVING FORCE OF VEHICLE

CROSS-REFERENCE TO RELATED APPLICATION

The present application claims priority to Korean Patent Application No. 10-2022-0073360 filed on Jun. 16, 2022, the entire contents of which is incorporated herein for all purposes by this reference.

BACKGROUND OF THE PRESENT DISCLOSURE

Field of the Present Disclosure

The present disclosure relates to a method for controlling driving force of a vehicle. More particularly, it relates to a method for resolving problems of a phenomenon of repeated occurrence of wheel slip caused by longitudinal load movement and deterioration of wheel slip control performance by reflecting pitch motion characteristics and longitudinal load movement information of a vehicle in real time in advance to control driving force of the vehicle.

Description of Related Art

Despite the recent introduction of various electronic control devices to a vehicle, motion of the vehicle is ultimately limited due to the limit of frictional force on a road surface. A reason therefor is that motion of the vehicle is obtained through frictional force with respect to the road surface through a tire. Therefore, how effectively the frictional force may be used is an important factor in determining the motion of the vehicle.

To effectively use the frictional force, it is important to control the frictional force which may be provided by the road surface so that driving force and braking force of the wheel do not exceed the frictional force. Here, the frictional force that can be provided by the road surface is complexly affected by road surface characteristics, longitudinal/lateral tire slip amount, tire vertical load, etc. Among these factors, the tire vertical load is a factor that most directly affects the frictional force on the road surface.

In general, as a method of using frictional force, it is known to use an electronic control device such as an anti-lock braking system (ABS) and a traction control system (TCS) to limit tire slip. However, control methods of the ABS and the TCS have disadvantages in that the methods do not effectively exhibit slip control performance due to a problem of wheel speed signal processing, etc. for prevention of control cycle delay or malfunction.

Furthermore, longitudinal motion of the vehicle is affected by an acceleration/deceleration driving force, which is inevitably accompanied by pitch movement by a suspension device of the vehicle. Because driving force control strategy so far has not considered pitch motion in detail, the pitch motion is passively generated according to the amount of driving force generated unless separate active suspension device control is applied.

According to the recent trend of wheel slip control strategies in electrified vehicles, many methods have been provided to use the torque and speed of a motor based on fast motion of the motor rather than using a vehicle body reference speed and a wheel speed.

This strategy has an advantage in that an absolute speed or a reference speed of the vehicle is not required, and thus may be effective in an e-4WD (4WD: Four Wheel Drive) system. However, unless a control operation is performed to reflect information related to suspension pitch motion and the tire vertical load changed by the suspension pitch motion in advance, a situation requiring driving force reduction control may be repeatedly encountered due to limitations of feedback control.

For example, when driving force of a front wheel is generated, a vehicle pitch angle increases, and then a vertical load of the front wheel decreases, causing tire slip at the front wheel. At the instant time, when the TCS is operated to reduce driving force of a front wheel, the tire slip amount of the front wheel is reduced and the pitch angle of the vehicle is reduced, so that the vertical load of the front wheel may be ensured again. However, when the driving force of the front wheel is subsequently increased, the vertical load of the front wheel decreases again while the pitch angle of the vehicle increases again, and thus tire slip of the front wheel may occur again.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method capable of resolving problems of a phenomenon of repeated occurrence of wheel slip caused by longitudinal load movement and deterioration of wheel slip control performance by reflecting pitch motion characteristics and longitudinal load movement information of a vehicle in real time in advance to control driving force of the vehicle.

Furthermore, various aspects of the present disclosure are directed to providing a method capable of limiting or controlling a fluctuation range of a grounding limit due to pitch motion or load movement occurring in a vehicle using a method of pre-correcting a driving force command. Various aspects of the present disclosure are directed to providing a filter-based feedforward/feedback control method configured for determining and correcting a driving force command for considering pitch motion.

The object of the present disclosure is not limited to the object mentioned above, and other objects not mentioned herein may be clearly understood by those of ordinary skill in the art to which an exemplary embodiment of the present disclosure belongs (hereinafter referred to as "person of ordinary skill") from the description below.

Various aspects of the present disclosure are directed to providing a method of controlling driving force of a vehicle, the method including determining a natural frequency of vehicle suspension pitch motion according to characteristics of a suspension device, providing a first filter for removing or reducing a natural frequency component of the vehicle suspension pitch motion, and a second filter for extracting or increasing the natural frequency component of the vehicle suspension pitch motion to a controller of the vehicle, determining, by the controller, a required driving force command based on vehicle driving information collected during driving of the vehicle, determining, by the controller, a driving force command after filter application through a processing process by the first filter taking the determined required driving force command as input thereof, determining, by the controller, a driving force correction amount through a processing process by the second filter taking feedback driving force as input thereof, the feedback driving force being a feedback value of a vehicle driving force, and correcting, by the controller, the driving force command after filter application using the driving force correction amount and controlling driving force applied to a driving wheel of the vehicle by a driving device of the vehicle using the driving force command after the correction.

Various aspects of the present disclosure are directed to providing a method of controlling driving force of a vehicle, the method including determining a natural frequency of vehicle suspension pitch motion according to characteristics of a suspension device, providing a first transfer function model for removing or reducing a natural frequency component of the vehicle suspension pitch motion, and a second transfer function model for extracting or increasing the natural frequency component of the vehicle suspension pitch motion to a controller of the vehicle, determining, by the controller, a required driving force command based on vehicle driving information collected during driving of the vehicle, determining, by the controller, a driving force command after transfer function model application through a processing process by the first transfer function model taking the determined required driving force command as input thereof, determining, by the controller, a driving force correction amount through a processing process by the second transfer function model taking feedback driving force as input thereof, the feedback driving force being a feedback value of a vehicle driving force, and correcting, by the controller, the driving force command after transfer function model application using the driving force correction amount and controlling driving force applied to a driving wheel of the vehicle by a driving device of the vehicle using the driving force command after the correction.

Other aspects and exemplary embodiments of the present disclosure are discussed infra.

The above and other features of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 3 is a flowchart illustrating a driving force control process of the vehicle according to various exemplary embodiments of the present disclosure;

FIG. 10, and FIG. 11 are diagrams for describing an effect of driving force control according to an exemplary embodiment of the present disclosure.

Figure 1:
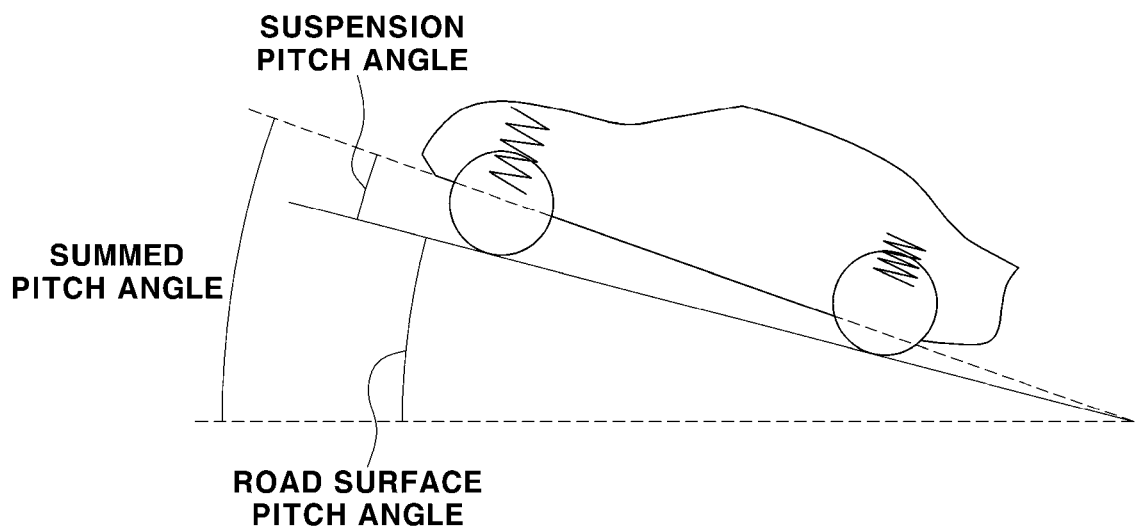
FIG. 1 is a diagram for describing a pitch angle in a vehicle.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will be made in detail to various embodiments of the present disclosure, examples of which are illustrated in the accompanying drawings and described below. While the present disclosure will be described in conjunction with exemplary embodiments of the present disclosure, it will be understood that the present description is not intended to limit the present disclosure to the exemplary embodiments of the present disclosure. On the other hand, the present disclosure is directed to cover not only the exemplary embodiments of the present disclosure, but also various alternatives, modifications, equivalents and other embodiments, which may be included within the spirit and scope of the present disclosure as defined by the appended claims.

Meanwhile, in an exemplary embodiment of the present disclosure, even though terms such as "first", "second", etc. may be used to describe various elements, the elements are not limited by these terms. These terms are only used to distinguish one element from another. For example, within the scope not departing from the scope of rights according to the concept of the present disclosure, a first element may be referred to as a second element, and similarly, the second element may be referred to as the first element.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween. Other expressions for describing a relationship between elements, that is, expressions such as "between" and "immediately between" or "adjacent to" and "directly adjacent to", should be interpreted similarly.

Like reference numerals refer to like elements throughout. The terminology used herein is for the purpose of describing the embodiments, and is not intended to limit the present disclosure. In the present specification, a singular expression includes the plural form unless the context clearly dictates otherwise. Referring to expressions "comprises" and/or "comprising" used in the specification, a mentioned component, step, operation, and/or element does not exclude the presence or addition of one or more other components, steps, operations, and/or elements.

Various embodiments of the present disclosure relates to a method for controlling driving force of a vehicle, and provides a method configured for resolving problems of a phenomenon of repeated occurrence of wheel slip caused by longitudinal load movement and deterioration of wheel slip control performance by reflecting pitch motion characteristics and longitudinal load movement information of a vehicle in real time in advance to control driving force of the vehicle.

In an exemplary embodiment of the present disclosure, to control driving force applied to a driving wheel of the vehicle by a driving device of the vehicle, information related to a transfer function TF, which receives a variable representing a driving state of the vehicle as input thereof, and determines and outputs state information related to pitch motion of the vehicle, is used.

The driving force may be a force due to the torque applied to the driving wheel by the driving device. Here, the driving device may be a motor in the case of a pure electric vehicle or a fuel cell electric vehicle, and may be a motor and an engine in the case of a hybrid electric vehicle. Here, both the pure electric vehicle and the fuel cell electric vehicle are vehicles, each of which has only a motor as the driving device and is driven only by the motor.

Accordingly, when the driving device configured for driving the vehicle is a motor, the torque applied to the driving wheel becomes the driving torque output by the motor. In the present instance, the driving force is a force for accelerating the vehicle and not a force for decelerating the vehicle (braking force), and is a force generated by the torque output by the motor to accelerate the vehicle.

Furthermore, when the driving device configured for driving the vehicle is a motor and an engine (internal combustion engine), the torque applied to the driving wheel becomes complex driving torque simultaneously output and transmitted from the motor and the engine. At the instant time, the driving force becomes a force generated by the torque output by the motor and the engine to accelerate the vehicle.

It is obvious that, even in the case of a hybrid vehicle provided with a motor and an engine, electric vehicle (EV) mode driving is performed in which the vehicle is driven only with the torque output by the motor. Thus, in an EV mode, the driving force is a force generated by the torque output by the motor.

For reference, in an exemplary embodiment of the present disclosure, control of the driving force may be performed by controlling the operation and output of the driving device, or by controlling the torque applied to the driving wheel. In the following description, "driving force" and "driving force command" may be replaced with "driving torque" and "driving torque command".

A basic concept of a driving force control method according to an exemplary embodiment of the present disclosure is to use state and characteristic information related to pitch motion of the vehicle. The existing driving force control method for suppressing wheel slip is mainly a feedback control method that corrects the driving force after wheel slip has already occurred.

However, in an exemplary embodiment of the present disclosure, before wheel slip occurs, the magnitude of the driving force is adjusted to correspond to the pitch motion in real time by use of the state and characteristic information related to the pitch motion of the vehicle, for example, vertical load change information.

As the state and characteristic information related to the pitch motion of the vehicle, mention may be made of the tire vertical load and the pitch angle of the vehicle. Of the vehicle load and the pitch angle, the tire vertical load is the most direct factor for determining a limit of traction between the road surface and the tire. As the tire vertical load increases, the available traction increases, making it difficult to cause wheel slip. As the tire vertical load decreases, the available traction decreases and wheel slip easily occurs.

There are many reasons for the change in the tire vertical load, and it is difficult to control the driving force while considering all the reasons including the change due to disturbance. Therefore, at least the change in the tire vertical load caused by the driving force itself, except for the change due to disturbance, is worth considering in a driving force control process.

Furthermore, when a driving force is generated in the vehicle, the pitch moment is generated due to a difference between the center of gravity and a pitch center of the vehicle, and the pitch motion of the vehicle is excited. At the instant time, a pitch angle is generated by mechanical characteristics of a suspension device and a vehicle body.

In general, a pitch angle increases when a vehicle accelerates, and a state of the vehicle at the instant time is referred to as nose-up motion or a squat state. Furthermore, when the vehicle decelerates, the pitch angle decreases, which is referred to as nose-down motion or a dive state.

When such pitch motion of the vehicle occurs, the suspension device of the vehicle is contracted or stretched. As a result, a spring or a damper of the suspension device is displaced, and the tire vertical load is affected.

In an exemplary embodiment of the present disclosure, only a suspension pitch angle and not a road surface pitch angle, is considered as the pitch motion, and definition of the suspension pitch angle is illustrated in FIG. 1. FIG. 1 is a diagram for describing a pitch angle in the vehicle.

As illustrated in the figure, the pitch angle in the vehicle may be divided into a suspension pitch angle and a road surface pitch angle, and the sum of the suspension pitch angle (absolute value) and the road surface pitch angle (absolute value) may be defined as a summed pitch angle.

When a stroke difference occurs between a front wheel suspension device and a rear wheel suspension device, so that the front wheel suspension device is more rebounded (stretched) than the rear wheel suspension device, and the rear wheel suspension device is more bumped (contracted) than the front wheel suspension device, the suspension pitch angle may be defined as a position (+) suspension pitch angle. At the instant time, a suspension pitch angle of a vehicle state illustrated in FIG. 1 is a positive value.

The road surface pitch angle corresponds to a longitudinal inclination of the vehicle due to an inclination of the road surface, and the suspension pitch angle represents a longitudinal (pitch direction) inclination of the vehicle caused by stretching or contraction of the front and rear wheel suspension devices. In a typical vehicle, the road surface pitch angle (road gradient) may be detected through a longitudinal acceleration sensor.

Information related to the suspension pitch angle (suspension pitch angle information) illustrated in FIG. 1 in the vehicle is information indicating a pitch direction vibration state of the vehicle according to a stroke change of the front suspension device and the rear suspension device during driving of the vehicle, which may be obtained through a sensor of the suspension device, or may be estimated based on information collected through a sensor in the vehicle.

A method of obtaining suspension pitch angle information through a sensor of a suspension device in a vehicle is known technology. For example, by use of a position sensor of the front wheel suspension device and a position sensor of the rear wheel suspension device to compare positions of the front wheel and the rear wheel based on signals of the position sensors, it is possible to determine suspension pitch angle information of the vehicle.

Furthermore, a method of estimating suspension pitch angle information is known technology. That is, there is a known method of obtaining a pitch angle by integrating a signal of a pitch angular velocity (pitch rate) sensor or kinematically estimating the pitch angle based on a longitudinal or vertical direction acceleration sensor value.

Furthermore, there are a method of estimating the pitch angle through a suspension device model-based observer, a method of determining the pitch angle through a wheel speed information and driving force information model, a method of observing pitch angle information using a sensor fusion method by integrating these methods, etc.

The vehicle state illustrated in FIG. 1 may be referred to as a state in which the suspension pitch angle indicates a positive (+) value direction thereof. In the present instance, the vehicle state may be referred to as a squat state based on the suspension pitch angle. Contrary to FIG. 1, when the suspension pitch angle indicates a negative (−) value direction, the vehicle state may be referred to as a dive state based on the suspension pitch angle.

Furthermore, the vehicle state illustrated in FIG. 1 is a state in which the vehicle body is tilted backward, and thus may be referred to as a squat state based on the vehicle body. The squat state (body squat state) with respect to the vehicle body may be referred to as a state in which the vehicle body is tilted backward based on a non-tilted horizontal line (inclination angle=0°).

Furthermore, a state in which the vehicle body is tilted forward may be referred to as a dive state with respect to the vehicle body, and the vehicle body dive state may be referred to as a state in which the vehicle body is tilted forward with respect to the horizontal line. As described above, the squat state may be induced based on the suspension pitch angle when the vehicle is accelerated, and the vehicle dive state may be induced based on the suspension pitch angle when the vehicle is decelerated.

At the present time, the change in the vehicle suspension pitch motion or the longitudinal load movement of the vehicle due to the change in the state of the suspension device appears according to characteristics (suspension device characteristics of the vehicle) determined by vehicle-specific suspension device setting. Here, the setting includes all of the spring stiffness, damping force, bushing stiffness, suspension arm flow geometry, etc. of the suspension device.

Due to these characteristics, suspension pitch motion such as dive (nose down)/squat (nose up) of the vehicle is generated while exhibiting the characteristics determined by the above setting. Here, the characteristics mean motion with a specific natural frequency.

Accordingly, a principle of the present disclosure is modeling the vehicle suspension pitch motion or longitudinal load movement determined by the setting and characteristics of the suspension device of the vehicle, removing a frequency component corresponding to a natural frequency of the present model from a driving force command using a filter, generating a driving force command that does not excite the suspension pitch motion or longitudinal load movement of the vehicle as much as possible, and controlling the driving force of the vehicle using the present driving force command, suppressing the pitch motion and the load movement of the vehicle and preventing wheel slip at the same time.

Figure 2A:
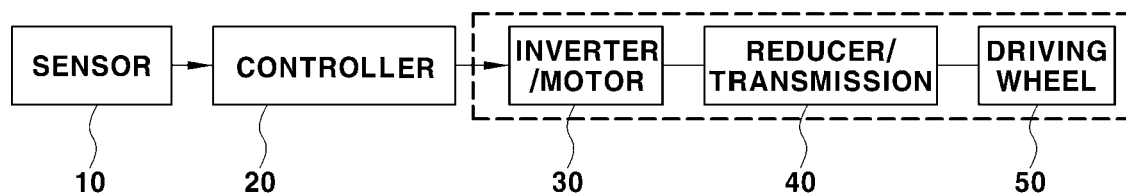
FIG. 2A and FIG. 2B are block diagrams illustrating configurations of an apparatus of performing driving force control according to various exemplary embodiments of the present disclosure.
Figure 2B:
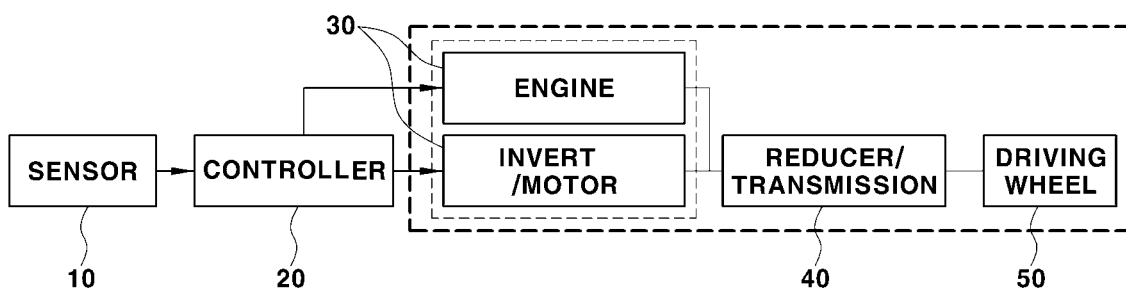

Hereinafter, an apparatus of controlling driving force according to an exemplary embodiment of the present disclosure will be described together with a detailed description of the driving force control method. FIG. 2A and FIG. 2B are block diagrams illustrating configurations of an apparatus of performing driving force control according to various exemplary embodiments of the present disclosure, and FIG. 3 is a flowchart illustrating a driving force control process of the vehicle according to an exemplary embodiment of the present disclosure.

Figure 4:
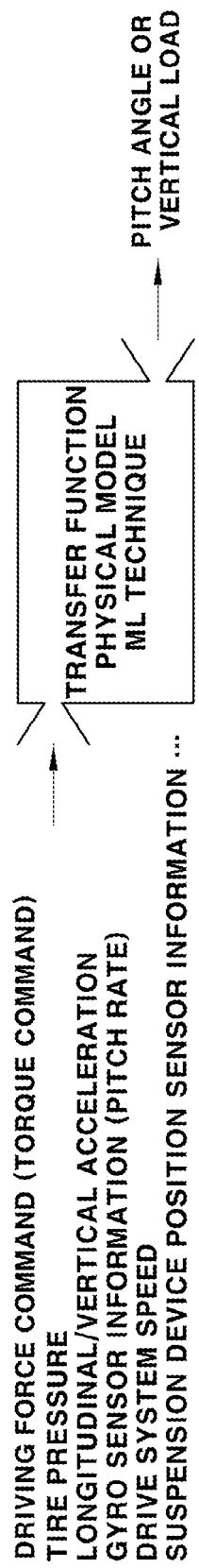
FIG. 4 is a diagram illustrating that a pitch angle or a vertical load may be determined using a transfer function in an exemplary embodiment of the present disclosure.
Figure 5:
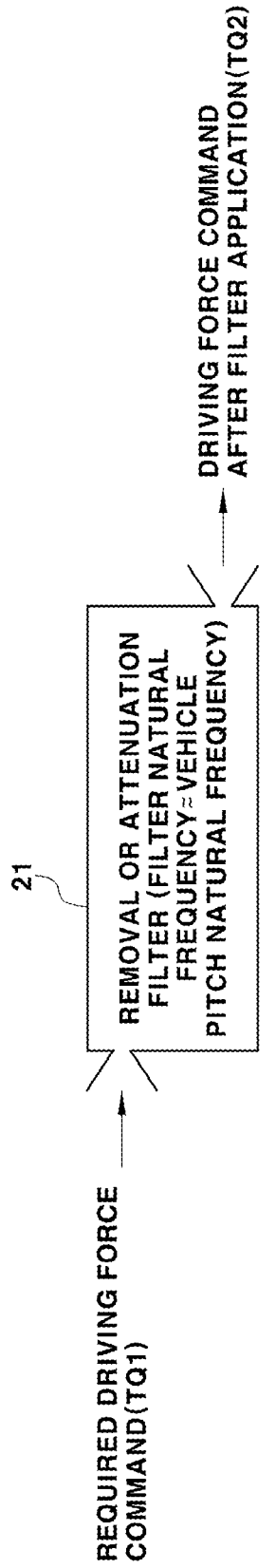
FIG. 5 is a block diagram illustrating input and output of a natural frequency removal or attenuation filter in an exemplary embodiment of the present disclosure.

Furthermore, FIG. 4 is a diagram illustrating that a pitch angle or a vertical load may be determined using a transfer function in various exemplary embodiments of the present disclosure, and FIG. 5 is a block diagram illustrating an input and output of a first filter which is a natural frequency removal or attenuation filter in various exemplary embodiments of the present disclosure.

Figure 6:
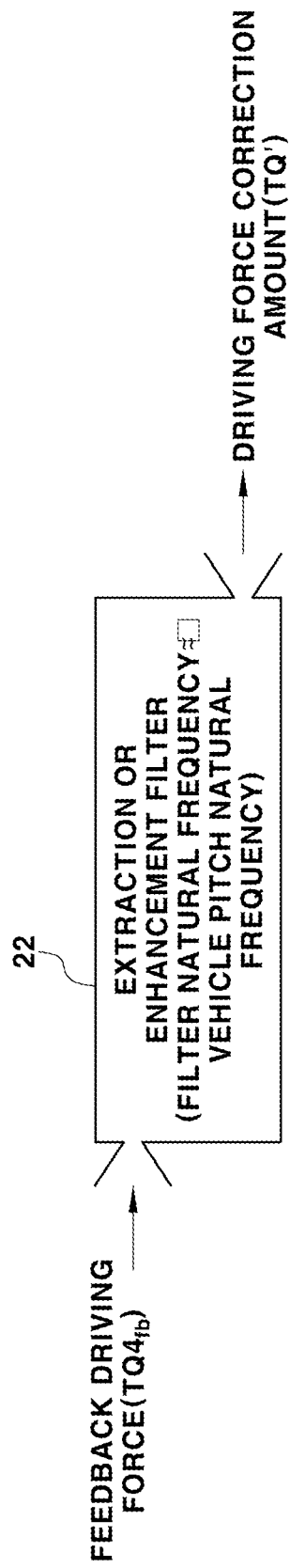
FIG. 6 is a block diagram illustrating input and output of a natural frequency extraction or enhancement filter in an exemplary embodiment of the present disclosure.
Figure 7:
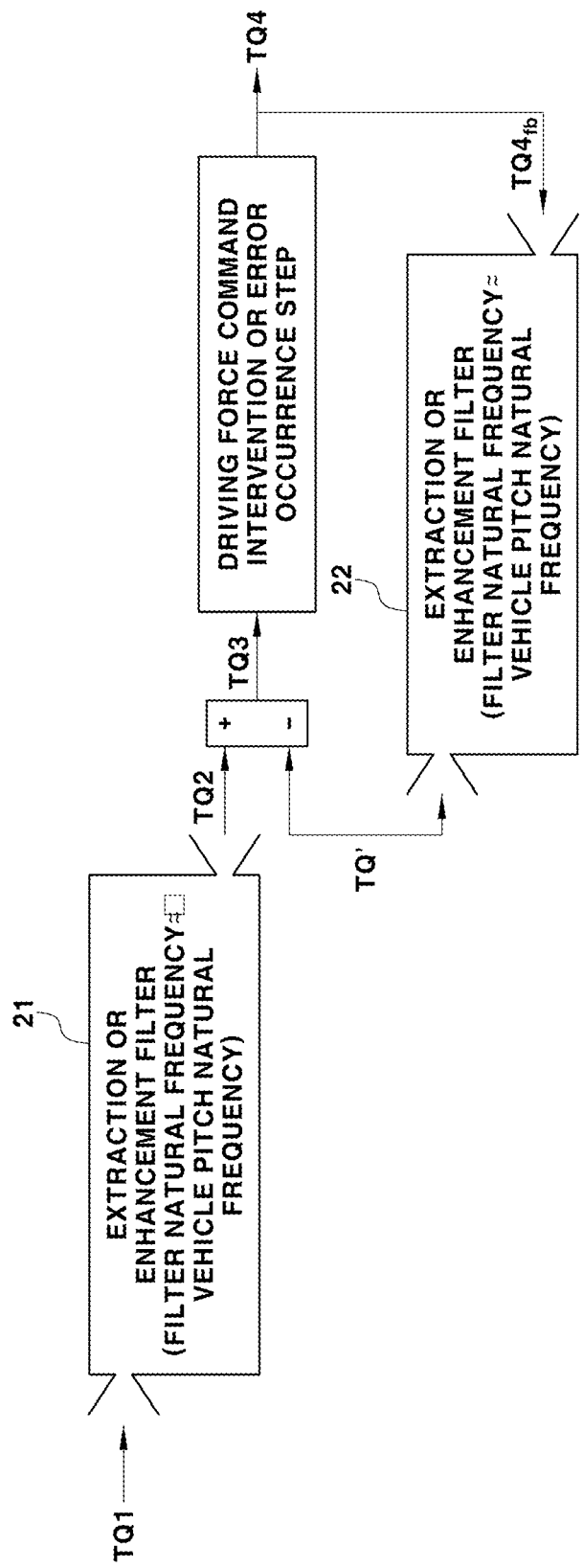
FIG. 7 is a block diagram illustrating an entire process including modification of a driving force command using a filter, determination of the amount of correction, correction of the driving force command, and command intervention or error occurrence in an exemplary embodiment of the present disclosure.

Furthermore, FIG. 6 is a block diagram illustrating an input and output of a second filter which is a natural frequency extraction or enhancement filter in various exemplary embodiments of the present disclosure, and FIG. 7 is a block diagram illustrating an entire process including modification of a driving force command using a filter, determination of the amount of correction, correction of the driving force command, and command intervention or error occurrence in various exemplary embodiments of the present disclosure.

First, referring to FIG. 2A and FIG. 2B, the apparatus of controlling the driving force according to an exemplary embodiment of the present disclosure includes a controller 20 configured to determine a driving force command from vehicle driving information and to control driving force applied to a driving wheel of the vehicle 50 using the determined driving force command, and a driving device 30, an operation (driving force output) of which is controlled according to the driving force command output by the controller 20, configured to generate driving force for driving the vehicle.

The driving device 30 is connected to the driving wheel 50 to be able to transmit power, and at the instant time, the driving wheel 50 is connected to the driving unit 30 through a reducer (or transmission) 40 to be able to transmit power to the driving unit 30. Thus, the driving force generated and output by the driving device 30 is transmitted and applied to the driving wheel 50 through the reducer (or transmission) 40.

As described above, each of the pure electric vehicle and the fuel cell electric vehicle includes a motor as the driving device 30, and includes an inverter for driving and controlling the motor according to a driving force command output by the controller along with the motor. As described above, in a state in which the motor and the inverter are mounted, a battery of the vehicle is connected to the motor through the inverter so that the battery may be charged and discharged.

Furthermore, the hybrid vehicle includes a motor and an engine (internal combustion engine) as the driving device 30, and even in the hybrid vehicle, the driving force generated and output by the driving device 30 is transmitted and applied to the driving wheel 50 through the reducer (or transmission) 40.

In the controller 20, a required driving force command is determined based on vehicle driving information collected in real time while the vehicle is driven (steps S1 and S2 in FIG. 3), and the controller 20 may be a controller configured for determining and generating a required driving force command based on vehicle driving information in a normal motor-driven vehicle, that is, a vehicle control unit (VCU) or a hybrid control unit (HCU).

In an exemplary embodiment of the present disclosure, "driving force command" refers to a total sum command obtained by summing driving force commands for each driving device when there is a plurality of driving devices 30 for driving the vehicle, and may refer to a total driving force command before driving force distribution to the driving force commands for each driving device is performed.

For example, in the case of a vehicle including an engine and a motor as the driving device, the driving force command is the total driving force command before distribution for each driving device is performed, that is, a total driving force command before distribution to an engine driving force command (engine driving torque command) and a motor driving force command (motor driving torque command).

Furthermore, in the case of a vehicle including a front wheel driving device and a rear wheel driving device as the driving device, the driving force command is a total driving force command before distribution to the front and rear wheels is performed, that is, a total driving force command before distribution to a front wheel driving force command (front wheel driving torque command) for the front wheel driving device and a rear wheel driving force (rear wheel driving torque command) for the rear wheel driving device.

In the following description, a driving force command, to which no filter is applied, and which is obtained by the controller 20 for the first time based on vehicle driving information collected in real time while the vehicle is driven, and is not subjected to any correction will be referred to as "required driving force command." In FIG. 5 and FIG. 7, "TQ1" is the required driving force command.

In an exemplary embodiment of the present disclosure, a method of determining the required driving force command from real-time vehicle driving information is not different from a known method of determining the required driving force command (required torque command) based on vehicle driving information in an ordinary vehicle.

Furthermore, the controller 20 includes a first filter 21 applied to the required driving force command, and the controller 20 applies the first filter 21 to the required driving force command to modify the required driving force command (step S3 in FIG. 3). In the following description, a driving force command obtained by applying the first filter 21 to the required driving force command will be referred to as "driving force command after filter application." In FIG. 5 and FIG. 7, "TQ2" is the driving force command after filter application.

Furthermore, the controller 20 includes a second filter 22 that receives feedback driving force $TQ4_{fb}$, which is a feedback value of a final driving force TQ4 applied to the driving wheel 50, as the final driving force TQ4 and outputs a driving force correction amount TQ'.

In the following description, the final total driving force actually applied to the entire driving wheel 50 by the driving device 30 of the vehicle and the final total driving force command for the driving device 30 are referred to as "final driving force" and "final driving force command," respectively. In FIG. 6 and FIG. 7, "TQ4" is a final driving force, which is a current final control result, or a final driving force command of a current control cycle.

Furthermore, in FIG. 6 and FIG. 7, "$TQ4_{fb}$" indicates the final driving force TQ4 or a feedback value of the final driving force command used as input of the second filter 22 to determine the driving force correction amount TQ'. In the following description, the final driving force or the feedback value of the final driving force command used as input of the second filter 22 will be referred to as "feedback driving force."

A difference between the final driving force (or final driving force command) TQ4 and the feedback driving force $TQ4_{fb}$ is only a difference of whether the value is a current final control result value (or final control value) or a feedback value for a next control cycle.

When TQ4 is a command (final driving force command) value as in various exemplary embodiments described later, TQ4 is a final command value of a current control cycle and becomes input of the second filter 22 used to generate a driving force correction amount in a next control cycle and $TQ4_{fb}$, which is a feedback value (feedback driving force) for generation of the driving force command (TQ3 or TQ4).

The controller 20 determines the driving force correction amount TQ' by applying the second filter 22 to the feedback driving force $TQ4_{fb}$, which is the feedback value of the final driving force (final driving force command) (step S4 in FIG. 3), and corrects the driving force command TQ2 after filter application modified by the first filter 21 using the driving force correction amount TQ' determined by the second filter 22 (step S5 in FIG. 3). Furthermore, the controller 20 performs driving force control for controlling the driving device 30 of the vehicle using the corrected driving force command (step S6 in FIG. 3).

In the following description, the driving force command obtained by correcting the driving force command TQ2 after the filter application using the driving force correction amount TQ' will be referred to as "driving force command after correction." In FIG. 6 and FIG. 7, "TQ3" is the driving force command after correction.

Configurations, functions, uses, processing processss, and actions and effects according to application of the first filter 21 and the second filter 22 will be described in detail later. Furthermore, the driving force command TQ2 after filter application, the driving force command TQ3 after correction, the final driving force TQ4, the feedback driving force TQ4fb, and the driving force correction amount TQ' will be described later.

Meanwhile, the required driving force command determined by the controller 20 is determined and generated based on vehicle driving information collected in real time while driving in the vehicle, and the vehicle driving information may be sensor detection information detected by a sensor 10 and input to the controller 20 through a vehicle network.

The sensor 10 detecting the vehicle driving information may include an accelerator pedal sensor (APS) detecting an accelerator pedal input value of a driver, a sensor configured for detecting a drive system speed, and a sensor configured for detecting a vehicle speed.

The drive system speed may be a rotation speed of the driving device 30 (driving device speed), a rotation speed (wheel speed or driving wheel speed) of the driving wheel 50 connected to the driving device 30 to be able to transmit power, or a rotation speed of a driveshaft (driveshaft speed).

Here, the rotation speed of the driving device 30 may be a rotation speed of the motor (motor speed). In the present instance, the sensor configured for detecting the drive system speed may be a sensor configured for detecting a speed of the motor, which may be a resolver for detecting a position of a rotor of the motor. Alternatively, the sensor configured for detecting the drive system speed may be a wheel speed sensor configured for detecting a rotation speed (wheel speed) of the driving wheel 50 or a sensor configured for detecting a rotation speed of the driveshaft.

Furthermore, the sensor configured for detecting the vehicle speed may also be a wheel speed sensor. Obtaining vehicle speed information from a signal of the wheel speed sensor is a well-known technology in the art, and thus a detailed description thereof will be omitted.

As the vehicle driving information detected by the sensor 10 and for determining the required driving force command by the controller 20, it is possible to selectively use an accelerator pedal input value (APS value) of the driver, a speed (rotation speed) of the driving device 30, a vehicle speed, etc. In the vehicle driving information, the accelerator pedal input value may be referred to as driver driving input information, and the speed and vehicle speed of the driving device 30 may be referred to as vehicle state information.

Alternatively, the vehicle driving information may be information determined by the controller 20 itself or may be information (for example, required driving force information) input to the controller 20 through the vehicle network from another controller (for example, ADAS controller) in the vehicle.

Furthermore, in the exemplary embodiment of the present disclosure, the sensor 10 may further include a sensor of the suspension device configured for obtaining suspension pitch angle information. Here, the sensor of the suspension device configured for obtaining the suspension pitch angle information may include the position sensor of the front wheel suspension device and the position sensor of the rear wheel suspension device.

As described above, a method for obtaining suspension pitch angle information through a sensor of a suspension device is known technology. For example, suspension pitch angle information of the vehicle may be determined by comparing the positions of the front wheel and the rear wheel based on a signal from the position sensor.

Furthermore, as described above, the suspension pitch angle, etc. may be obtained by an estimation process determined based on information collected from the vehicle through a sensor, etc. Because an estimation method thereof is a well-known technical item at the level of those skilled in the art, a detailed description thereof will be omitted.

Meanwhile, while the vehicle is accelerating, suspension pitch motion of the vehicle occurs in a nose-up (squat) direction, and at the instant time, the load is transferred to the rear of the vehicle. Therefore, when compared to a neutral state of the load (stationary state), the vertical load of the front axle decreases, making it easy to cause wheel slip, and the vertical load of the rear axle increases, making it difficult to generate wheel slip. Therefore, in the instant case, to prevent front wheel slip, it is to perform a control operation to remove the natural frequency component of the pitch motion from the driving force command.

In consideration of the present point, in an exemplary embodiment of the present disclosure, a filter (natural frequency removal filter) or a transfer function model capable of removing the natural frequency component of the vehicle suspension pitch motion is applied to the required driving force command to prevent front wheel slip and maximize driving and driving performance. In the present instance, the filter is the above-described first filter 21, and the first filter 21 in the controller 20 is configured so that the natural frequency is equal to or close to the natural frequency of the vehicle suspension pitch motion.

In the exemplary embodiment of the present disclosure, instead of the first filter 21 applied to the required driving force command and the second filter 22 outputting the driving force correction amount, transfer function models performing the same functions as those of the first filter 21 and the second filter 22, respectively, may be used. Accordingly, in the following description, the first filter and the second filter may be replaced with transfer function models each performing the same function.

In the exemplary embodiment of the present disclosure, the first filter 21 serves to remove or attenuate (reduce) a frequency component of a specific band in the required driving force command, and in the present instance, the natural frequency of the first filter may be set to a value equal to or close to the natural frequency of the suspension pitch motion of the vehicle. In an exemplary embodiment of the present disclosure, attenuating the frequency component of the specific band means reducing the frequency component of the specific band.

Accordingly, according to the first filter 22, it is possible to remove or attenuate (reduce) the natural frequency component of the suspension pitch motion according to the suspension device characteristics of the vehicle in the required driving force command which is input. Furthermore, a driving force command ("driving force command after filter application") in which the natural frequency component of the suspension pitch motion is removed or attenuated (reduced) in the first filter 22 may be determined and output.

To remove or attenuate (reduce) the frequency component that excites the suspension pitch motion of the vehicle in the required driving force command using the filter, first, the frequency characteristic of the suspension pitch motion for the vehicle to be controlled needs to be identified. This process may be performed by constructing various types of transfer functions.

In an exemplary embodiment of the present disclosure, for driving force control, information of a transfer function is used, in which a variable representing a vehicle driving state is taken as input and state information related to suspension pitch motion of the vehicle is output.

Here, the information of the transfer function may be a natural frequency, and the state information related to the suspension pitch motion, which is output of the transfer function, may be suspension pitch angle information or tire vertical load information. The tire vertical load information may include a front wheel vertical load and a rear wheel vertical load.

In an exemplary embodiment of the present disclosure, the suspension pitch angle (hereinafter abbreviated as "pitch angle") or the tire vertical load (hereinafter abbreviated as "vertical load") may be determined using a transfer function, and an example of determining the pitch angle or vertical load using the transfer function will be described as follows.

In an exemplary embodiment of the present disclosure, the transfer function is modeled and constructed to be able to determine state information related to the suspension pitch motion of the vehicle by inputting a variable representing the vehicle driving state. Here, the state information related to the suspension pitch motion of the vehicle may be a pitch angle or a vertical load.

In various exemplary embodiments of the present disclosure, the transfer function may take the following form.

As illustrated in FIG. 4, a transfer function taking driving force information (driving force command) as input and outputting pitch angle information, or a transfer function taking pitch angle information as input and outputting vertical load information may be constructed in the controller 20 and used. Here, the driving force information may be a required driving force command determined by the controller 20.

The required driving force command and the pitch angle, which are input to the transfer function, are variable information indicating the vehicle driving state, and may be obtained from information detected by the sensor 10. It has been described above that the required driving force command is determined from the sensor detection information, and that the pitch angle may be obtained from information detected by a suspension device position sensor in the sensor 10.

Alternatively, a transfer function taking driving force information as input and outputting vertical load information, or a transfer function taking tire pressure information detected by a tire pressure sensor in the sensor 10 as input and outputting vertical load information may be constructed in the controller 20 and used.

Alternatively, a transfer function taking longitudinal or vertical acceleration information of the vehicle detected by a longitudinal acceleration sensor or a vertical acceleration sensor provided in the vehicle in the sensor 10 as input and outputting pitch angle or vertical load information may be constructed in the controller 20 and used.

Alternatively, a transfer function taking pitch angle change rate (pitch rate and pitch angular velocity) information obtained by a gyro sensor (pitch rate sensor) in the sensor 10 as input and outputting pitch angle or vertical load information may be constructed in the controller and used.

Alternatively, a transfer function taking a drive system speed as input and outputting pitch angle or vertical load information may be constructed in the controller and used. Here, the drive system speed may be a wheel speed detected by the sensor 10, or a driving device speed (motor speed), or driveshaft speed.

Alternatively, a transfer function taking information detected by a suspension travel sensor as input and outputting pitch angle or vertical load information may be constructed in the controller and used.

Alternatively, a transfer function taking two pieces or more of the above-mentioned input information as input and outputting pitch angle or vertical load information may be constructed in the controller and used.

Here, the transfer function may be set to determine the pitch angle or vertical load using a data-based optimization technique or a numerical solution.

Alternatively, a transfer function based on a physical model may be constructed and used, or a learning technique may be used to obtain the transfer function. Furthermore, an algorithm including the above input and output may be constructed using various machine learning techniques in addition to the transfer function.

Meanwhile, a state in which the transfer function is constructed in the controller, that is, in a state in which a transfer function configured for outputting pitch angle or vertical load information, which is state information related to the suspension pitch motion of the vehicle, by taking a variable representing the vehicle driving state as input is constructed, a natural frequency of the transfer function may be determined. In the present instance, the transfer function may represent the unique characteristics of the vehicle to which the driving force control method of the present disclosure is applied.

In an exemplary embodiment of the present disclosure, as described above, the natural frequency of the transfer function constructed to output the state information related to the suspension pitch motion of the vehicle by taking the variable representing the vehicle driving state as input may be regarded as a natural frequency of suspension pitch motion vibration in a vehicle to be controlled. In the following description, "the natural frequency of the transfer function" and "the natural frequency of the vehicle suspension pitch motion" may have the same meaning.

Furthermore, in a state in which the natural frequency of the vehicle suspension pitch motion, that is, the natural frequency of the pre-constructed transfer function, is determined as described above, the first filter 21 taking the required driving force command as input and the second filter 22 taking the feedback driving force as input and outputting the driving force correction amount are configured and set in the controller 20 based on natural frequency information of the determined transfer function to control the driving force of the vehicle.

In the present instance, the first filter 21 configured for removing or attenuating (reducing) the frequency component corresponding to the natural frequency of the transfer function in the required driving force command, and the second filter 22 configured for extracting or enhancing (increasing) the frequency component corresponding to the natural frequency of the transfer function in the feedback driving force may be configured and set in the controller 20. In various exemplary embodiments of the present disclosure, the first filter 21 and the second filter 22 may be filters each configured and set using a Laplace transfer function.

As described above, in a state in which the transfer function is constructed in the controller 20 of the vehicle to which an exemplary embodiment of the present disclosure is actually applied, suspension pitch motion information of the vehicle (state information related to the suspension pitch motion of the vehicle), such as a pitch angle or vertical load, which is the output of the transfer function, may be used in various ways for vehicle control. Furthermore, the natural frequency of the transfer function constructed in the controller of the vehicle may be used to design and configure the filter in the controller as in an exemplary embodiment of the present disclosure.

Furthermore, as described above, the natural frequency is not determined in a state in which the transfer function is constructed in the controller 20 of the actual vehicle to which an exemplary embodiment of the present disclosure is applied, and the natural frequency of the transfer function may be obtained after the transfer function described above is constructed through a preceding evaluation and test process conducted in a development stage of the same type of vehicle. Furthermore, the first filter 21 and the second filter 22 designed using the natural frequency information obtained in the instant way may be configured and set in a controller of an actual mass-produced vehicle and used for driving force control.

Hereinafter, the first filter and the second filter will be described in more detail. FIG. 5 illustrates use of the first filter 21 taking the required driving force command TQ1 as input thereof, and FIG. 6 illustrates use of the second filter 22 taking the feedback driving force $TQ4_{fb}$ as input and outputting the driving force correction amount TQ'.

In an exemplary embodiment of the present disclosure, as a specific frequency component of the transfer function, a frequency component to be removed or attenuated (reduced) through the first filter 21 may be a natural frequency component of the vehicle suspension pitch motion, and a driving force command including a frequency component corresponding to the natural frequency of the vehicle suspension pitch motion excites the vehicle suspension pitch motion.

Therefore, the frequency to be removed through the first filter 21 may be determined as the natural frequency of the vehicle suspension pitch motion and be used to configure the first filter 21 which is the natural frequency removal or attenuation filter. In the present instance, the natural frequency of the vehicle suspension pitch motion may be determined as the natural frequency of a transfer function outputting the pitch angle or vertical load, which is state information related to the suspension pitch motion, described above.

In an exemplary embodiment of the present disclosure, when the vehicle suspension pitch motion vibration is analyzed in the frequency domain (for example, analyzed in a Bode plot), a primary frequency, at which the peak gain occurs, may be defined as the natural frequency.

A driving force command including a frequency component corresponding to the above-mentioned natural frequency excites the vehicle suspension pitch motion, and as a result, longitudinal load movement (load movement to the rear in the vehicle) severely occurs. Thus, a possibility that slip will occur in a vehicle wheel including decreased traction, particularly in the front wheel of the vehicle, increases. Therefore, it is desirable to remove the natural frequency component from the driving force command to reduce the wheel slip of the vehicle and decrease the suspension pitch motion.

Accordingly, in an exemplary embodiment of the present disclosure, information related to a transfer function that outputs the state information related to the suspension pitch motion of the vehicle is used. The first filter 21 configured for removing or attenuating (reducing) the natural frequency component of the transfer function using the natural frequency information of the transfer function indicating the natural frequency of the vehicle suspension pitch motion is configured in the controller 20.

Furthermore, the controller 20 utilizes the first filter 21, which is the natural frequency removal or attenuation filter, to process the required driving force command TQ1, and applies the first filter 21 to the required driving force command TQ1 to remove or attenuate the natural frequency component of the vehicle suspension pitch motion in the driving force command (see FIG. 5).

The first filter 21 may include a low-pass filter including a cut-off frequency corresponding to the natural frequency of the transfer function of the suspension pitch motion, a high-pass filter, a notch filter (a band stop filter or a band cancellation filter) including a center frequency corresponding to the natural frequency, etc. In the present instance, one such filter may be used to configure the first filter 21, or several filters may be overlapped and used to configure the first filter 21.

Furthermore, the cut-off frequency of the low-pass filter or the high-pass filter, or the center frequency of the notch filter may not exactly match a natural frequency to be removed. However, because the first filter 21 is for removing or attenuating the component corresponding to the natural frequency of the transfer function of the suspension pitch motion constructed in advance from the required driving force command, an effective natural frequency band of the first filter 21 needs to be set to include the natural frequency of the vehicle suspension pitch motion.

However, considering an error range of a set natural frequency value, in the case of the low-pass filter, the natural frequency of the vehicle suspension pitch motion, which is the natural frequency to be removed, needs to be set to be equal to or greater than the natural frequency of the filter.

Furthermore, in the case of the high-pass filter, the natural frequency of the vehicle suspension pitch motion needs to be set to be equal to or lower than the natural frequency of the filter, and in the case of the notch filter, the natural frequency of the vehicle suspension pitch motion needs to be present within a notch band (stop band) of the filter.

In addition to the low-pass filter, the high-pass filter, or the notch filter, a multi-dimensional filter may be used as the first filter 21 to remove or attenuate the component corresponding to the natural frequency. Furthermore, as described above, the filter may be replaced with the transfer function model, and the filter may be designed using the transfer function itself constructed by modeling the real-time vertical load caused by the above-described vehicle suspension pitch motion or longitudinal load movement.

For example, it is assumed that a transfer function TF for deriving a pitch angle (squat angle, φ) from an actual driving force command (torque command, Tq) is constructed as in the following Equation 1.

$$TF = \frac{\phi}{Tq} = \frac{1}{c_1 s^2 + c_2 s + c_3} \quad \text{[Equation 1]}$$

In the instant case, a filter based on the transfer function TF may be designed and configured as illustrated in Equation 2 below, and may be applied to the driving force command by the controller and used to control the driving force of the vehicle.

$$1 - c_4 sTF - c_5 TF = 1 - \frac{c_4 s}{c_1 s^2 + c_2 s + c_3} - \frac{c_5}{c_1 s^2 + c_2 s + c_3} = \quad \text{[Equation 2]}$$
$$\frac{1}{c_1 s^2 + c_2 s + c_3}(c_1 s^2 + c_2 s + c_3 - c_4 s - c_5) =$$
$$\frac{c_1 s^2 + (c_2 - c_4)s + (c_3 - c_5)}{c_1 s^2 + c_2 s + c_3}$$

Here, $c_1$, $c_2$, $c_3$, $c_4$, $c_5$, etc. are coefficients which may be set (positive or negative), and s is a Laplace operator.

In the present way, the first filter 21 has been described in detail, and as illustrated in FIG. 5, the first filter 21 takes the required driving force command TQ1 as input and outputs the modified required driving force command (that is, "driving force command after filter application") TQ2 in which the natural frequency component of the vehicle suspension pitch motion is removed or attenuated.

In the case of an electric vehicle provided with only a motor as the driving device 30, or in the EV mode of the hybrid vehicle, the driving force commands TQ1 and TQ2 are motor driving force commands (motor torque commands). Furthermore, in the HEV mode of the hybrid vehicle, the driving force commands TQ1 and TQ2 are the sum of the engine driving force command and the motor driving force command as described above. It is obvious that the motor driving force command obtained by subtracting the engine driving force command from the driving force command is the motor torque command after considering a relative gear ratio, etc.

In general, because responsiveness of motor torque control is faster and better than responsiveness of the engine, in an exemplary embodiment of the present disclosure, correction and control of the driving force may be performed through motor driving force control instead of the engine.

Next, with reference to FIG. 6, a more detailed description will be provided of a configuration of the second filter 22, that is, a filter configured for passing a specific frequency component of the pre-constructed transfer function, that is, the natural frequency component in the feedback driving force $TQ4_{fb}$.

The total braking force command in which the natural frequency component of the vehicle suspension pitch motion is removed or attenuated by the first filter 21 in the required driving force command TQ1, that is, the driving force command TQ2 after filter application, is the most ideal braking force command for controlling the driving force of the vehicle.

However, the driving force command TQ2 after filter application may be different from the final driving force actually applied to the driving wheel 50, or the final driving force command TQ4. The difference therebetween may occur due to intervention of an incidental driving device, an error in the driving force generated from the driving device, etc. or may occur due to fluctuations in the torque command additionally intervened for reasons such as fail safety, mode change, learning logic, real-time calibration, chassis control, and drivability.

Therefore, additional correction is required after application of the first filter 21, and to correct the driving force command, it is necessary to first extract the component to be corrected. Accordingly, the second filter 22 or a transfer function model having the same or similar function is required, which extracts or enhances (increases) a signal component corresponding to the natural frequency of the vehicle suspension pitch motion in the input driving force command (feedback driving force $TQ4_{fb}$) to determine a value.

This process is necessary because the corresponding command component may be removed from the driving force command simply by extracting the natural frequency component of the vehicle suspension pitch motion. Accordingly, in an exemplary embodiment of the present disclosure, the driving force correction amount is determined through a filter or a transfer function model that can pass a specific frequency component, that is, a natural frequency component of the vehicle suspension pitch motion.

Passing the natural frequency component in the second filter 22 means extracting or enhancing the natural frequency component in the feedback driving force. Accordingly, in an exemplary embodiment of the present disclosure, the second filter that passes the natural frequency component (that is, the natural frequency pass filter) may be referred to as a filter that extracts or enhances the natural frequency component (that is, the natural frequency extraction or enhancement filter). Furthermore, enhancing the natural frequency component in an exemplary embodiment of the present disclosure means increasing the natural frequency component.

In an exemplary embodiment of the present disclosure, the frequency component passing through the second filter 22 as a specific frequency component of the transfer function may be a natural frequency component of the vehicle suspension pitch motion, in the present instance, the natural frequency component of the transfer function and the natural frequency component of the vehicle suspension pitch motion have no difference from those of the first filter, and thus a further detailed description will be omitted.

The second filter 22 may be a low-pass filter or a high-pass filter including a cut-off frequency corresponding to the natural frequency of the transfer function of the suspension pitch motion, a band-pass filter including a center frequency corresponding to the natural frequency, etc.

In the second filter 22, the cut-off frequency of the low-pass filter or the high-pass filter or the center frequency of the band-pass filter may not exactly match the natural frequency to be passed.

However, in the case of the low-pass filter, the natural frequency of the vehicle suspension pitch motion needs to be set to be equal to or lower than the natural frequency of the filter, and in the case of the high-pass filter, the natural frequency of the vehicle suspension pitch motion needs to be set to be equal to or greater than the natural frequency of the filter. Furthermore, in the case of the band-pass filter, the natural frequency of the vehicle suspension pitch motion needs to be set to be present within a pass band (pass bandwidth) of the filter.

Furthermore, when the transfer function model is used, a function of the corresponding transfer function needs to pass (extract or enhance) a specific frequency component, and at the instant time, the passed (extracted or enhanced) frequency band needs to include the natural frequency of the vehicle suspension pitch motion.

Furthermore, the second filter 22 for determining and outputting the driving force correction amount TQ' may be configured using one filter or transfer function model mentioned above. However, the second filter 22 may be configured using a plurality of filters or transfer function models.

When the plurality of filters or transfer function models is used, the plurality of filters or transfer function models may be connected in parallel in the second filter 22, and the driving force correction amount obtained through each filter or transfer function model may be simultaneously used in a correction process.

In the present instance, the final driving force correction amount TQ' may be obtained by applying a preset gain value to each of the driving force correction amounts obtained in parallel, and then summing all the driving force correction amounts to which the gain value is applied. The final driving force correction amount TQ' is used to correct the driving force command TQ2 after filter application, which is the output of the first filter 21, generating the driving force command TQ3 after correction.

In addition to the high-pass filter or the band-pass filter, a multi-dimensional filter may be used to enhance the component corresponding to the natural frequency. Furthermore, the filter may be designed using the transfer function itself constructed by modeling the real-time vertical load caused by the above-described suspension pitch motion or longitudinal load movement of the vehicle.

For example, it is assumed that a transfer function TF for deriving a pitch angle (squat angle, φ) from feedback driving force (a driving force command or an actual driving force) is constructed as in the following Equation 3. In Equation 3, Tq is a torque command, and the present torque command is the feedback driving force $TQ4_{fb}$.

$$TF = \frac{\phi}{Tq} = \frac{1}{c_1 s^2 + c_2 s + c_3} \qquad \text{[Equation 3]}$$

In the instant case, a filter based on the transfer function TF may be designed and configured as illustrated in Equation 4 below, and may be applied to the driving force command by the controller and used to control the driving force of the vehicle.

$$c_4 s TF + c_5 TF = \qquad \text{[Equation 4]}$$

$$\frac{c_4 s}{c_1 s^2 + c_2 s + c_3} + \frac{c_5}{c_1 s^2 + c_2 s + c_3} = \frac{c_4 s + c_5}{c_1 s^2 + c_2 s + c_3}$$

Here, $c_1$, $c_2$, $c_3$, $c_4$, $c_5$, etc. are coefficients which may be set (positive or negative), and s is a Laplace operator.

The driving force correction amount TQ' determined and output by the second filter 22 using the feedback driving force $TQ4_{fb}$ as input is used to correct the driving force command TQ2 after filter application, which is the output of the first filter 21. In the present instance, correction may be performed using a scheme of subtracting the driving force correction amount TQ' from the driving force command TQ2 after filter application.

As described above, in an exemplary embodiment of the present disclosure, the filter may be replaced with a transfer function model. That is, in the description of the present disclosure, "first filter" may be replaced with "first transfer function model," "second filter" may be replaced with "second transfer function model," and "driving force command after filter application" may be replaced with "driving force command after application of transfer function model."

Hereinafter, a process in which the feedback driving force and the final braking force are determined will be described with reference to FIG. 7.

In FIG. 7, the feedback driving force $TQ4_{fb}$ is the final driving force or the feedback value of the final driving force command. When the driving force correction amount TQ' is determined by the second filter 22 taking the present feedback driving force $TQ4_{fb}$ as input thereof, the driving force command TQ2 after filter application, which is output of the first filter 21, is corrected using the determined driving force correction amount TQ', and the driving force command TQ3 after correction is determined.

The driving device 30 may be controlled based on the driving force command TQ3 after correction determined in the present way. As various exemplary embodiments of the present disclosure, driving force control for controlling the driving device 30 of the vehicle may be performed according to the driving force command TQ3 after correction.

In the present instance, according to the driving force command TQ3 after correction, driving force control for controlling a single driving device 30 or simultaneously controlling a plurality of driving devices may be performed. When the plurality of driving devices is simultaneously controlled, a driving force command for each driving device may be determined by distribution of the driving force from the driving force command TQ3 after correction, and the respective driving devices are simultaneously controlled according to the determined driving force command for each driving device.

Here, an example of the distribution of the driving force may include distribution of an engine driving force command (engine torque command) and a motor driving force command (motor torque command). That is, the driving force command TQ3 after correction may be distributed as the engine driving force command and the motor driving force command, and driving of the engine and the motor, which are the driving device 30 of the corresponding vehicle, is controlled according to each of the distributed driving force commands.

As described above, a driving force distribution process performed in a vehicle provided with a plurality of driving devices is well-known to those of ordinary skill in the art, and thus a detailed description thereof will be omitted herein.

Furthermore, while driving force control for controlling the driving device 30 is performed according to the driving force command TQ3 after correction as described above, an error may occur in the driving force actually applied to the driving wheel 50 due to unintended disturbance, etc.

In the present instance, the driving force actually finally applied to the driving wheel 50 by the driving device 30 is the final driving force TQ4. It is obvious that, when a plurality of driving devices 30 is mounted, the final driving force TQ4 becomes the sum of driving forces actually applied to the driving wheel 50 by all the driving devices.

In the various exemplary embodiments of the present disclosure, TQ4 illustrated in FIG. 7 is the final driving force including an error, which is a final driving force indicated by including an unintended error in a target driving force value, that is, the driving force command TQ3 value, and may be a value obtained by adding an error to the driving force command TQ3 after correction. That is, there is an error caused by unintended disturbance between the driving force command TQ3 after correction and the final driving force TQ4 (|TQ4−TQ3|=error).

Furthermore, the final driving force TQ4 is a value indicated as a final control result of a current control cycle, which is feedback driving force $TQ4_{fb}$ used to determine the driving force correction amount TQ' in the next control cycle, and becomes input of the second filter 22 for determining the driving force correction amount TQ' as described above, which means that the feedback driving force $TQ4_{fb}$ used to determine the driving force correction amount TQ' in the current control cycle is a value indicated as a final control result of an immediately preceding control cycle.

As described above, because the final driving force TQ4 of the current control cycle needs to be used as the feedback driving force $TQ4_{fb}$ of the next control cycle, the controller 20 needs to know the magnitude of the final driving force (feedback driving force), which may be realized using a detecting or estimation method.

That is, the final driving force actually applied to the driving wheel 50 may be a sensor detection value known through a sensor in the controller 20 or an estimate of the driving force estimated according to an estimation process determined by the controller 20. For example, the final driving force TQ4 may be a motor torque estimation value estimated from inverter driving information or an output shaft torque estimation value obtained by correcting a gear ratio with respect to the motor torque estimation value.

Accordingly, the final driving force may not be a command value, and may be a value known to the controller 20 in real time by being detected by a sensor or estimated by a predetermined estimation process, and the current final driving force TQ4 becomes the feedback driving force $TQ4_{fb}$, which is input of the second filter 22 in the next control cycle.

As described above in the various exemplary embodiments of the present disclosure, the driving force command TQ3 after correction, the final driving force TQ4, and the feedback driving force $TQ4_{fb}$ may be clearly distinguished and understood by those skilled in the art.

Next, the various exemplary embodiments are an exemplary embodiment in which a difference between the driving force command TQ3 after correction and the final driving force command TQ4 occurs due to command intervention intended by the controller 20 or an error. For example, the controller 20 may perform additional correction or generate an intended command error with respect to the driving force command TQ3 after correction according to a predetermined control logic, and the difference between the driving force command TQ3 after correction and the final driving force command TQ4 may be caused by additional correction or control intervention involving intended error occurrence, etc.

For example, additional control intervention is required for certain reasons, such as when slip occurs and needs to be responded to or when torque needs to be increased or decreased in response to a vehicle attitude control request, and additional correction of the driving force command TQ3 after correction may be performed by the controller 20. In the present instance, the difference between the driving force command TQ3 after correction and the final driving force command TQ4 becomes an additional correction amount.

In the present various exemplary embodiments of the present disclosure, TQ4 becomes the final driving force command, and the final driving force command TQ4 becomes the feedback driving force TQ4$_{fb}$ which is the input of the second filter 22 in the next control cycle, which is used to determine the driving force correction amount TQ' in the second filter 22. That is, the feedback driving force TQ4$_{fb}$ which is input to the second filter 22 in the current control cycle is the final driving force command TQ4 determined in the immediately preceding control cycle.

In the present various exemplary embodiments of the present disclosure, driving force distribution for distributing the driving force command for each driving device may be performed with respect to the driving force command TQ3 after correction or may be performed with respect to the final driving force command TQ4 in which the additional correction command is interposed.

When driving force distribution is performed with respect to the driving force command TQ3 after correction, control intervention such as additional correction may be performed for the distributed driving force command for each driving device, and then the sum of the driving force commands for all driving devices becomes the final driving force command TQ4.

In both cases, the controller 20 knows the final driving force command TQ4, and the final driving force command TQ4 of the current control cycle is used as the feedback driving force TQ4$_{fb}$, which is the input of the second filter 22 in the next control cycle.

Referring to FIG. 7, the first filter 21, which is the natural frequency removal or attenuation filter, is applied to the required driving force command TQ1 determined based on real-time vehicle driving information. A reason for applying the natural frequency removal or attenuation filter in the instant way is to remove or attenuate a component which may excite the natural frequency of the vehicle pitch motion existing in a shape of the required driving force command TQ1.

When the driving force command (driving torque command) includes the natural frequency component of the vehicle pitch motion, the component becomes a main cause of the vehicle pitch motion when accelerating the vehicle. However, when the corresponding component is removed through the first filter 21, even if the pitch motion occurs, because there is no excitation component, the pitch motion may be attenuated.

Furthermore, referring to FIG. 7, in a process of determining the driving force correction amount TQ3 to correct the driving force command TQ2 after filter application, which is the output of the first filter 21, the second filter 22 which is the natural frequency extraction or enhancement filter is applied. A reason for applying the natural frequency extraction or enhancement filter in the instant way is to find the natural frequency component of the vehicle pitch motion which is already transmitted to the vehicle.

A main cause of transmission of the natural frequency component of the vehicle pitch motion is in a command intervention or error occurrence stage due to additional correction, etc. As a result, an unintended excitation component of the vehicle pitch motion is transmitted to the vehicle. For tracking in real time, the component needs to be extracted from an actual transmitted torque shape. Accordingly, a filter configured for extracting or enhancing the natural frequency component is used as the second filter 22.

The excitation component extracted in the instant way is corrected so that the excitation component is subtracted from the driving force command after filter application in real time, which works as a real-time pre-correction strategy for the currently occurring command intervention or error occurrence stage.

Figure 8A:
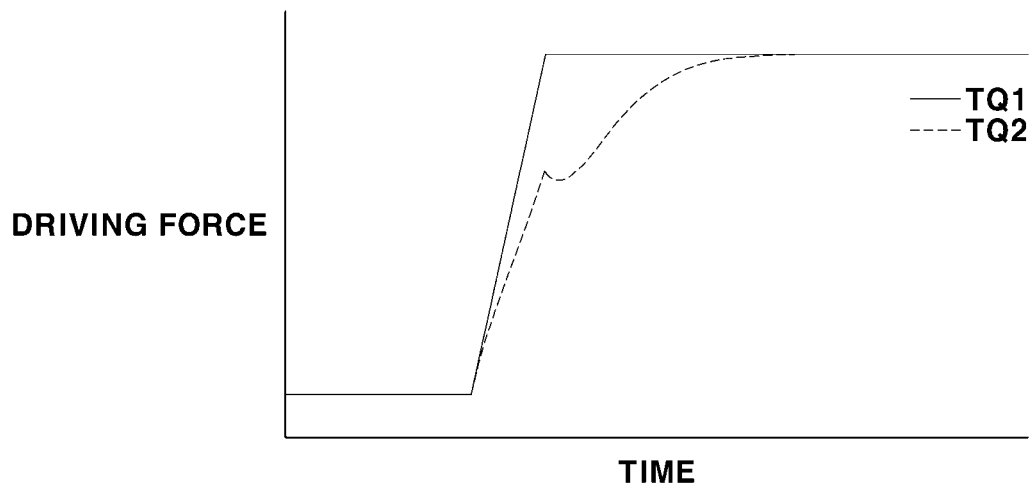
FIG. 8A, FIG. 8B, FIG. 8C, FIG. 8D and FIG. 8E are diagrams illustrating driving force commands of embodiments of the present disclosure and comparative examples.

Meanwhile, FIG. 8A, FIG. 8B, FIG. 8C, FIG. 8D and FIG. 8E are diagrams illustrating driving force commands of the exemplary embodiments of the present disclosure and the comparative examples, and FIG. 8A illustrates the required driving force command TQ1 and the driving force command TQ2 after filter application obtained by applying the first filter 21 which is the natural frequency removal or attenuation filter to the required driving force command TQ1 in an exemplary embodiment of the present disclosure. After the present filter is applied, the driving force command TQ2 is the most ideal driving force command.

Figure 8B:
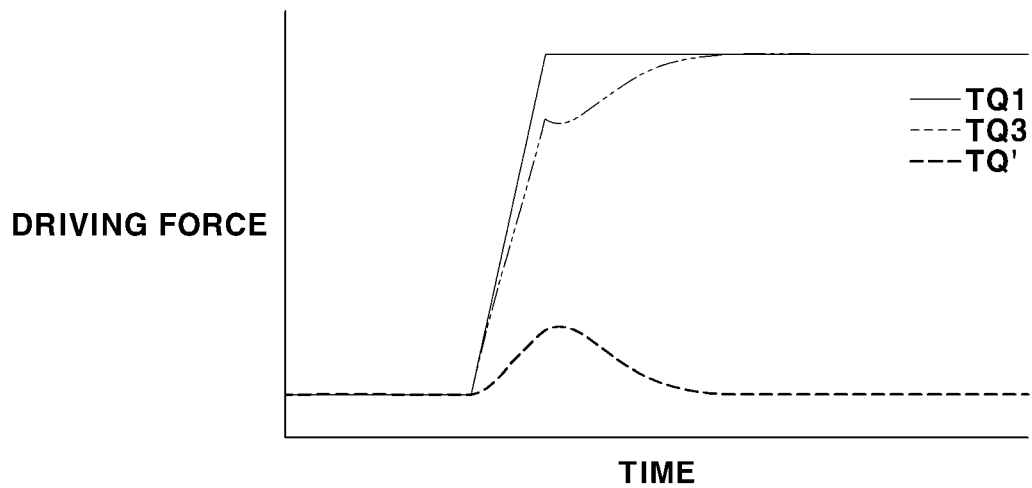

FIG. 8B is a diagram illustrating a comparative example, and illustrates the required driving force command TQ1, the driving force correction amount TQ' obtained by applying the second filter 22 which is the natural frequency extraction or enhancement filter to the present required driving force command TQ1, and the driving force command TQ3 after correction obtained by correcting the required driving force command TQ1 using the present driving force correction amount TQ'.

Figure 8C:
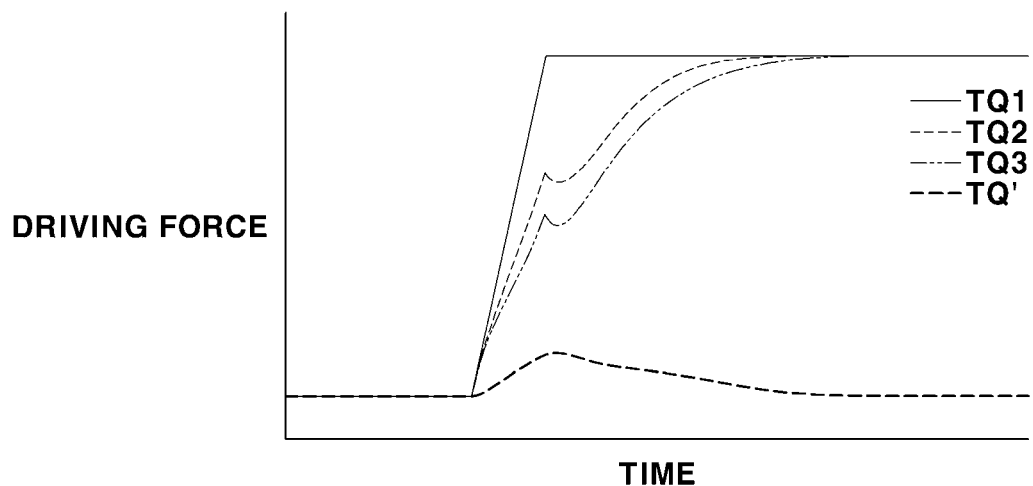

FIG. 8C is a diagram illustrating another exemplary embodiment of the present disclosure, and illustrates the required driving force command TQ1, the driving force command TQ2 after filter application obtained by applying the first filter 21 which is the natural frequency removal or attenuation filter to the required driving force command TQ1, the driving force correction amount TQ' obtained by applying the second filter 22 which is the natural frequency extraction or enhancement filter to the driving force command TQ2 after filter application, and the driving force command TQ3 after correction obtained by correcting the driving force command TQ2 after filter application using the present driving force correction amount TQ'.

Accordingly, in another exemplary embodiment of the present disclosure, unlike those illustrated in FIG. 6 and FIG. 7, the driving force command TQ2 after filter application in the immediately preceding control cycle, which is output of the first filter 21 and the ideal command, may be used as input of the second filter 22 in the current control cycle for determining the driving force correction amount TQ'.

That is, the driving force command after filter application in the immediately preceding control cycle may be used as the feedback driving force $TQ_{fb}$, which is input of the second filter 22 for determining the driving force correction amount TQ'. Furthermore, the driving force command TQ3 after correction in the immediately preceding control cycle as the feedback driving force $TQ_{fb}$ in the current control cycle may be used to determine driving force correction amount TQ' as the feedback driving force $TQ_{fb}$, which is input of the second filter 22.

Figure 8D:
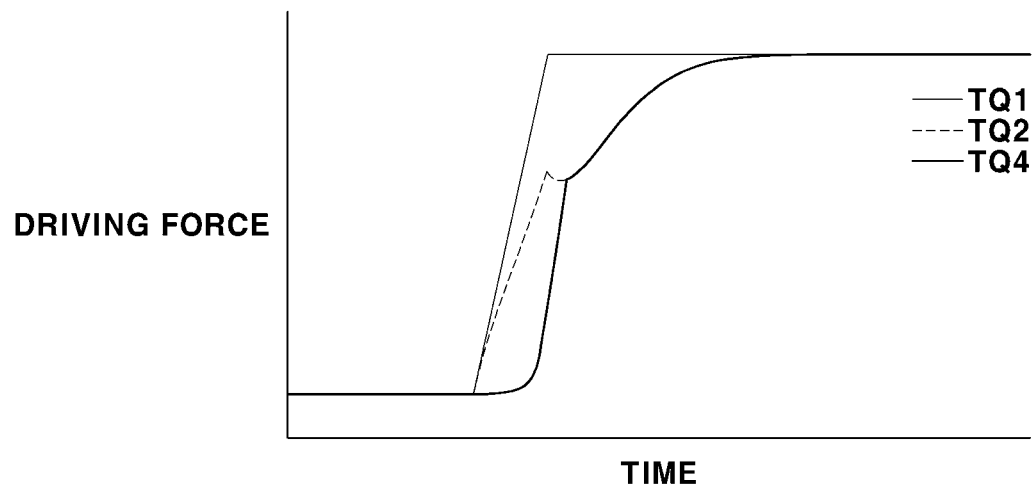
Figure 8E:
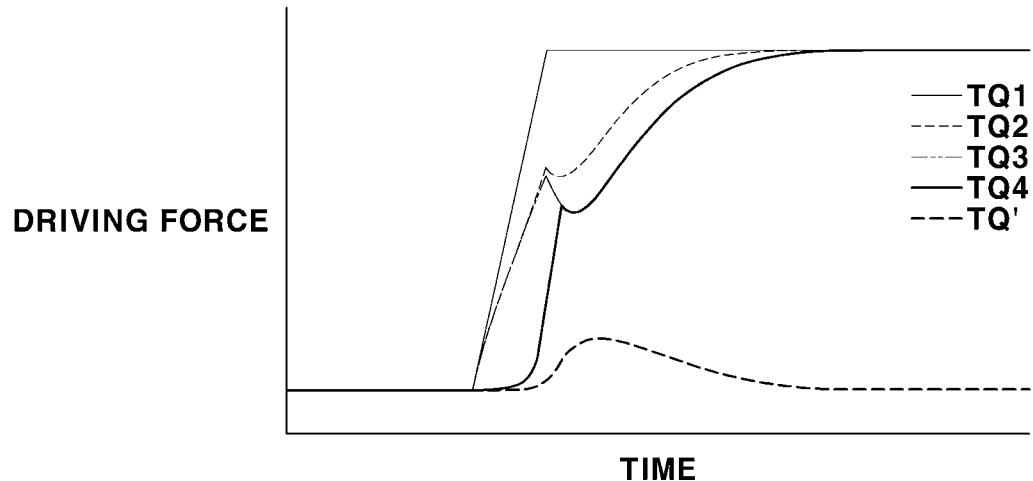

FIG. 8D illustrates the required driving force command TQ1, the driving force command TQ2 after filter application, and the final driving force command TQ4 of FIG. 7 in an exemplary embodiment of the present disclosure, and FIG. 8E is various exemplary embodiments of the present disclosure illustrating the required driving force command TQ1, the driving force command TQ2 after filter application, the driving force command TQ3 after correction, the final driving force command TQ4, and the driving force correction amount TQ' of FIG. 7. It may be considered that a driving force command closer to a value of the driving force command TQ2 after filter application, which is an ideal driving force command, is a more preferable driving force command.

Figure 9:
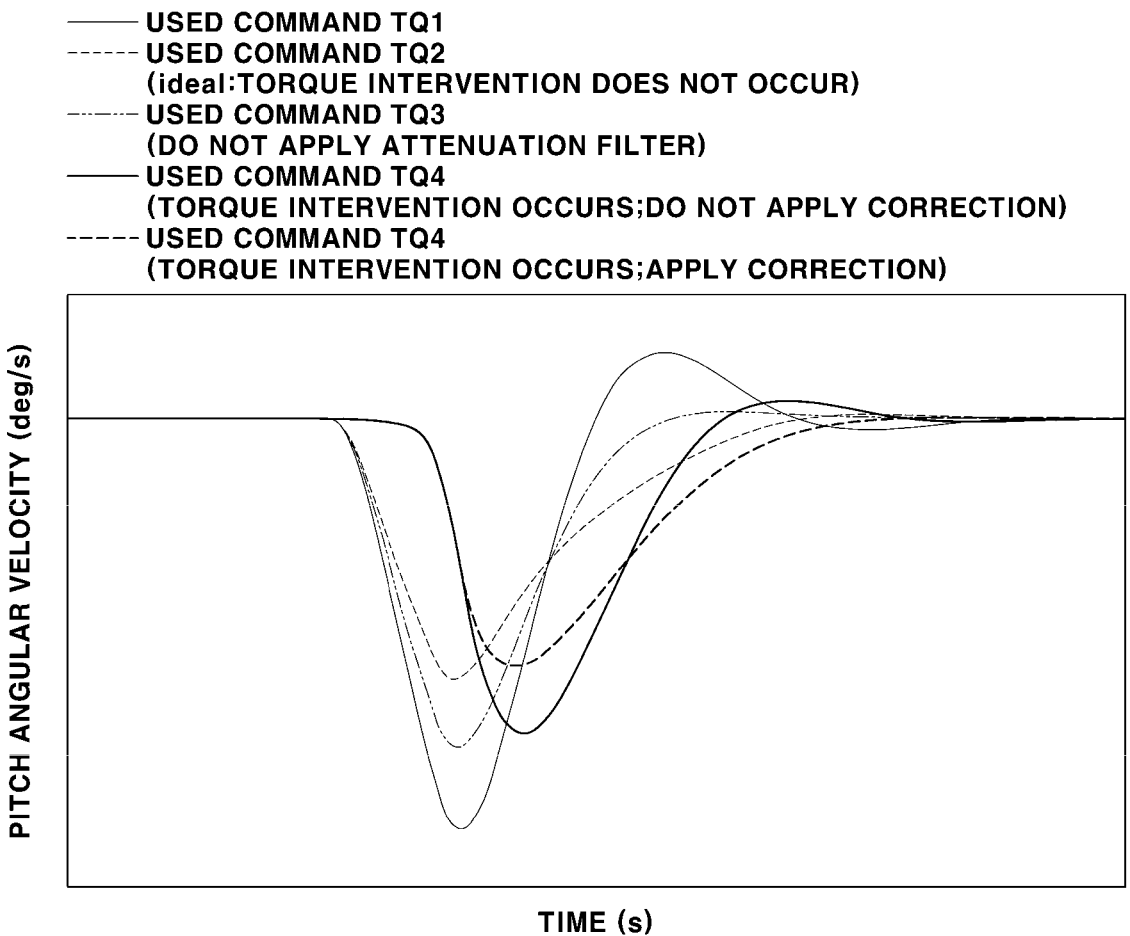
FIG. 9 is a diagram illustrating states of pitch angular velocities when the driving force commands of the exemplary embodiments of the present disclosure and the comparative examples are used.

Next, FIG. 9 is a diagram illustrating states of pitch angular velocities when the driving force commands of the exemplary embodiments of the present disclosure and the comparative examples are used. Table 1 below shows pitch angular velocity deviation and improvement values according to each used command.

In Table 1 below, the used command is the final command used to control the driving device, and the pitch angular velocity deviation is a difference between the maximum and minimum values of the pitch angular velocity (deg/s). Furthermore, the improvement value represents an improvement (reduction) ratio of a pitch angular velocity deviation of each case to that of Case 1 with respect to the pitch angular velocity deviation of Case 1.

A deviation of the pitch angular velocity (deg/s) during acceleration/deceleration is closely related to a change in traction due to load movement, and slip control and assurance of ride comfort become easy as the deviation of the pitch angular velocity decreases. Accordingly, through simulation, the deviation of the pitch angular velocity for each control application case was compared as illustrated in FIG. 9 and Table 1 below.

TABLE 1

| | Used command | Deviation of pitch angular velocity (deg/s) | Improvement value (%) |
|---|---|---|---|
| Case 1 | TQ1 command is used | 8.138 | Reference |
| Case 2 | TQ2 command is used (ideal: torque intervention does not occur) | 4.519 | 44.5% |
| Case 3 | TQ3 command is used (attenuation filter is not applied) | 5.745 | 29.4% |
| Case 4 | TQ4 command is used (torque intervention occurs, correction strategy is not applied) | 5.688 | 30.1% |
| Case 5 | TQ4 command is used (torque intervention occurs, correction strategy is applied) | 4.251 | 47.8% |

The used command is used as the final driving force command for controlling the driving force of the driving device. In Case 1 and Case 2, the driving device 30 is controlled using the required driving force command TQ1 and the driving force command TQ2 after filter application, respectively.

In Case 3, when the driving force correction amount is obtained by applying the second filter 22, which is the natural frequency extraction or enhancement filter, to TQ3, which is the used command in the immediately preceding control cycle (TQ3→TQ'), without using the first filter 21, which is the natural frequency removal or attenuation filter, the required driving force command TQ1 in the current control cycle is corrected using the obtained driving force correction amount TQ' (TQ1→TQ3, TQ1−TQ'=TQ3), and the driving device 30 is controlled using the driving force command TQ3 after correction corrected in the present way.

In Case 4, when the driving force command TQ2 after filter application is obtained by applying the first filter 21, which is the natural frequency removal or attenuation filter, to the required driving force command TQ1, the driving force command TQ2 after filter application is additionally corrected (TQ2→TQ4) without correction of the present driving force command after filter application, and then the driving device 30 is controlled using the additionally corrected final driving force command TQ4.

Case 5 is according to an exemplary embodiment of the present disclosure, and is a result of controlling the driving device 30 using the final driving force command TQ4 undergoing all processes illustrated in FIG. 7 (overlapping application of the first filter and the second filter). The improvement value was the largest in Case 5.

Figure 10:
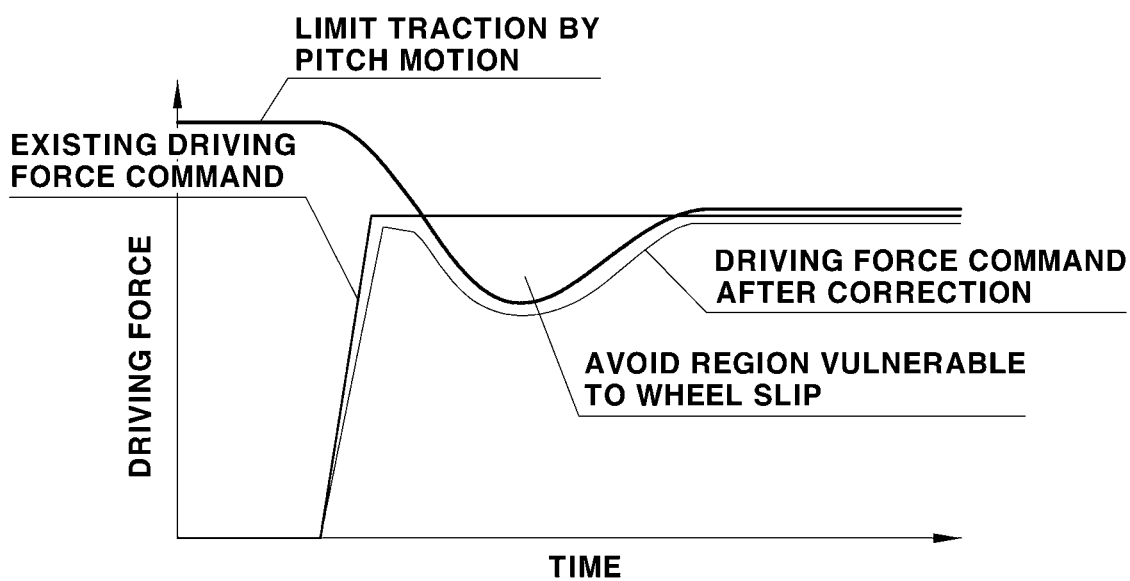

Next, FIG. 10, and FIG. 11 are diagrams for describing effects of driving force control according to an exemplary embodiment of the present disclosure.

As illustrated in FIG. 10, when driving force command correction using a filter that removes or reduces the corresponding natural frequency component from the driving force command and driving force control according to the driving force command after correction are performed in consideration of the natural frequency characteristics of the vehicle suspension pitch motion (pitch motion), it is possible to perform driving force reduction control before occurrence of wheel slip.

Next, as illustrated in FIG. 11, when driving force command correction using a filter that removes or reduces the corresponding natural frequency component from the driving force command and driving force control according to the driving force command after correction are performed in consideration of the natural frequency characteristics of the vehicle suspension pitch motion, it is possible to attenuate excessive suspension pitch motion of the vehicle. That is, it is possible to obtain an effect of attenuating the nose-up (squat) phenomenon when compared to the driving force control according to the existing driving force command.

As a result, according to the driving force control method of the present disclosure, it is possible to effectively prevent wheel slip only by applying a software method without a change in vehicle hardware or a cost increase factor, and it is possible to achieve increased tire durability through wheel slip prevention. Furthermore, it is possible to obtain effects of improving the vehicle acceleration performance through maximum use of suspension pitch motion limit traction, and improving ride comfort due to the suspension pitch motion attenuation.

Accordingly, according to the method for controlling the driving force of the vehicle according to an exemplary embodiment of the present disclosure, it is possible to effectively prevent wheel slip simply by applying a software method without a change in vehicle hardware or a cost increase factor, and it is possible to achieve increased tire durability through wheel slip prevention. Furthermore, it is possible to obtain effects of improving the vehicle driving performance through maximum use of suspension pitch motion limit traction, and improving ride comfort due to the suspension pitch motion attenuation.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling driving force of a vehicle, the method comprising:
   determining a natural frequency of vehicle suspension pitch motion according to characteristics of a suspension device of the vehicle;
   providing a first filter for removing or reducing the natural frequency of the vehicle suspension pitch motion, and a second filter for extracting or increasing the natural frequency of the vehicle suspension pitch motion to a controller of the vehicle;
   determining, by the controller, a required driving force command based on vehicle driving information collected during driving of the vehicle;
   determining, by the controller, a driving force command after filter application through a processing process by the first filter taking the determined required driving force command as input thereof;
   determining, by the controller, a driving force correction amount through a processing process by the second filter taking feedback driving force as input thereof, the feedback driving force being a feedback value of a vehicle driving force; and
   correcting, by the controller, the driving force command after the filter application using the driving force correction amount and controlling driving force applied to a driving wheel of the vehicle by a driving device of the vehicle using the driving force command after the correction.

2. The method of claim 1, further including constructing a transfer function modeled to determine and output state information related to the vehicle suspension pitch motion by taking a variable representing a vehicle driving state as input thereof, wherein the natural frequency of the vehicle suspension pitch motion is determined as a natural frequency of the constructed transfer function.

3. The method of claim 2, wherein the state information related to the vehicle suspension pitch motion is tire vertical load or a suspension pitch angle indicating a longitudinal inclination of the vehicle due to stretching or contraction of a front wheel suspension device and a rear wheel suspension device of the vehicle in the vehicle driving state.

4. The method of claim 1, wherein the first filter is selected from:

a low-pass filter and a high-pass filter including a cut-off frequency corresponding to the natural frequency of the vehicle suspension pitch motion; and a notch filter including a center frequency corresponding to the natural frequency of the vehicle suspension pitch motion.

5. The method of claim 4, wherein in the low-pass filter, the natural frequency of the vehicle suspension pitch motion is set to be equal to or greater than a natural frequency of the filter;

in the high-pass filter, the natural frequency of the vehicle suspension pitch motion is set to be equal to or lower than a natural frequency of the filter; and in the notch filter, the natural frequency of the vehicle suspension pitch motion is within a stop bandwidth of the filter.

6. The method of claim 1, wherein the second filter is selected from:

a low-pass filter and a high-pass filter including a cut-off frequency corresponding to the natural frequency of the vehicle suspension pitch motion; and a band-pass filter including a center frequency corresponding to the natural frequency of the vehicle suspension pitch motion.

7. The method of claim 6, wherein in the low-pass filter, the natural frequency of the vehicle suspension pitch motion is set to be equal to or lower than a natural frequency of the filter;

in the high-pass filter, the natural frequency of the vehicle suspension pitch motion is set to be equal to or greater than a natural frequency of the filter; and in the band-pass filter, the natural frequency of the vehicle suspension pitch motion is within a pass band of the filter.

8. The method of claim 1, wherein the second filter has a configuration in which a plurality of filters for extracting or increasing the natural frequency of the vehicle suspension pitch motion is connected in parallel, and wherein the controller is configured to utilize a value obtained by applying a preset gain value to each driving force correction amount, which is output of each of the filters connected in parallel, and then adding resultant values as a driving force correction amount for correcting the driving force command after the filter application.

9. The method of claim 1, wherein the driving force command after the filter application in an immediately preceding control cycle is used as input of the second filter in a current control cycle as the feedback driving force which is the feedback value of the vehicle driving force.

10. The method of claim 1, wherein the driving force command after the correction in an immediately preceding control cycle is used as input of the second filter in a current control cycle as the feedback driving force which is the feedback value of the vehicle driving force.

11. The method of claim 1, wherein in the controlling of the driving force applied to the driving wheel, an operation of the driving device is controlled according to the driving force command after the correction; and in the determining of the driving force correction amount, a real-time sensor detection value or an estimate of a final driving force actually applied to the driving wheel by the driving device is used as input of the second filter as the feedback driving force which is the feedback value of the vehicle driving force.

12. The method of claim 1, wherein in the controlling of the driving force applied to the driving wheel, additional correction is performed according to a predetermined control logic for the driving force command after the correction, and an operation of the driving device is controlled according to an additionally corrected final driving force command; and in the determining of the driving force correction amount, the additionally corrected final driving force command in an immediately preceding control cycle is used as input of the second filter in a current control cycle as the feedback driving force which is the feedback value of the vehicle driving force.

13. A method of controlling driving force of a vehicle, the method comprising:

determining a natural frequency of vehicle suspension pitch motion according to characteristics of a suspension device of the vehicle;

providing a first transfer function model for removing or reducing the natural frequency of the vehicle suspension pitch motion, and a second transfer function model for extracting or increasing the natural frequency of the vehicle suspension pitch motion to a controller of the vehicle;

determining, by the controller, a required driving force command based on vehicle driving information collected during driving of the vehicle;

determining, by the controller, a driving force command after transfer function model application through a processing process by the first transfer function model taking the determined required driving force command as input thereof;

determining, by the controller, a driving force correction amount through a processing process by the second transfer function model taking feedback driving force as input thereof, the feedback driving force being a feedback value of a vehicle driving force; and correcting, by the controller, the driving force command after transfer function model application using the driving force correction amount and controlling driving force applied to a driving wheel of the vehicle by a driving device of the vehicle using the driving force command after the correction.

14. The method of claim 13, further including:

constructing a transfer function modeled to determine and output state information related to the vehicle suspension pitch motion by taking a variable representing a vehicle driving state as input thereof, wherein the natural frequency of the vehicle suspension pitch motion is determined as a natural frequency of the constructed transfer function.

15. The method of claim 14, wherein the state information related to the vehicle suspension pitch motion is tire vertical load or a suspension pitch angle indicating a longitudinal inclination of the vehicle due to stretching or contraction of a front wheel suspension device and a rear wheel suspension device of the vehicle in the vehicle driving state.

16. The method of claim 13, wherein the driving force command after the transfer function model application in an immediately preceding control cycle is used as input of the second transfer function model in a current control cycle as the feedback driving force which is the feedback value of the vehicle driving force.

17. The method of claim 13, wherein the driving force command after the correction in an immediately preceding control cycle is used as input of the second transfer function model in a current control cycle as the feedback driving force which is the feedback value of the vehicle driving force.

18. The method of claim 13, wherein;
in the controlling of the driving force applied to the driving wheel, an operation of the driving device is controlled according to the driving force command after the correction; and
in the determining of the driving force correction amount, a real-time sensor detection value or an estimate of a final driving force actually applied to the driving wheel by the driving device is used as input of the second transfer function model as the feedback driving force which is the feedback value of the vehicle driving force.

19. The method of claim 13, wherein;
in the controlling of the driving force applied to the driving wheel, additional correction is performed according to a predetermined control logic for the driving force command after the correction, and an operation of the driving device is controlled according to an additionally corrected final driving force command; and
in the determining of the driving force correction amount, the additionally corrected final driving force command in an immediately preceding control cycle is used as input of the second transfer function model in a current control cycle as the feedback driving force which is the feedback value of the vehicle driving force.

* * * * *